United States Patent
Tiwari

(10) Patent No.: US 9,979,009 B2
(45) Date of Patent: May 22, 2018

(54) ENERGY STORAGE DEVICE HAVING A LASER WELD

(71) Applicant: INTEL CORPORATION, Santa Clara, CA (US)

(72) Inventor: Prabhat Tiwari, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/973,307

(22) Filed: Dec. 17, 2015

(65) Prior Publication Data
US 2017/0179466 A1   Jun. 22, 2017

(51) Int. Cl.
| | | |
|---|---|---|
| H01M 2/26 | (2006.01) | |
| H01M 4/04 | (2006.01) | |
| B23K 26/22 | (2006.01) | |
| H01M 10/0525 | (2010.01) | |

(52) U.S. Cl.
CPC .......... *H01M 4/0471* (2013.01); *B23K 26/22* (2013.01); *H01M 2/26* (2013.01); *H01M 10/0525* (2013.01); *H01M 2220/10* (2013.01); *H01M 2220/30* (2013.01)

(58) Field of Classification Search
CPC .. H01M 4/0471; H01M 2/26; H01M 10/0525; B23K 26/22
See application file for complete search history.

(56) References Cited

U.S. PATENT DOCUMENTS

| | | | |
|---|---|---|---|
| 6,447,950 B1 | 9/2002 | Iijima | |
| 2009/0197162 A1* | 8/2009 | Shinyashiki | H01M 10/0413 429/161 |
| 2010/0124694 A1* | 5/2010 | Hikata | B26F 1/384 429/94 |
| 2013/0230766 A1 | 9/2013 | Ahn | |
| 2014/0050969 A1* | 2/2014 | Rust, III | H01M 10/0525 429/160 |
| 2014/0272566 A1 | 9/2014 | Kylyvnyk et al. | |
| 2014/0272589 A1* | 9/2014 | Sanada | H01M 4/38 429/222 |
| 2015/0213967 A1* | 7/2015 | Yokouchi | H01M 4/661 429/211 |
| 2015/0295270 A1 | 10/2015 | Chun | |
| 2016/0293993 A1* | 10/2016 | Keates | H01M 10/0431 |

OTHER PUBLICATIONS

PCT International Search Report, PCT Application No. PCT/US2016/057170, dated Jan. 11, 2017, 4 pages.

* cited by examiner

*Primary Examiner* — Stewart A Fraser
(74) *Attorney, Agent, or Firm* — International IP Law Group, P.L.L.C.

(57) ABSTRACT

A system and method for an energy storage device, such as a battery, having an electrode tab, an electrode, and a laser weld coupling the electrode tab to the electrode. The electronic storage device or battery may be installed in an electronic device. Fabrication of the energy storage device may involve placing an electrode tab adjacent a surface of a thin layer of the electrode, and laser welding the electrode tab to the thin layer.

16 Claims, 6 Drawing Sheets

100

600

ENERGY STORAGE DEVICE HAVING A LASER WELD

TECHNICAL FIELD

The present techniques relate generally to energy storage devices and their manufacture and, more particularly, to batteries and their fabrication including laser welding.

BACKGROUND ART

An electric battery generally has one or more electrochemical cells that convert stored chemical energy into electrical energy. Each cell has a positive terminal, or cathode, and a negative terminal, or anode. The terminal marked positive may be at a higher electrical potential energy than the terminal marked negative. The terminal marked positive may be the source of electrons that when connected to an external circuit will flow and deliver energy to an external device. When a battery is connected to an external circuit, electrolytes are able to move as ions within, allowing the chemical reactions to be completed at the separate terminals and so deliver energy to the external circuit. The movement of those ions within the battery provides for current to flow out of the battery to perform work.

Single-use or "disposable" batteries (e.g., alkaline battery) are typically used once and discarded. The electrode materials are generally irreversibly changed during discharge. Rechargeable batteries can typically be discharged and recharged multiple times. The original composition of the electrodes can be restored or partially restored by reverse current. Examples of rechargeable batteries include lead-acid batteries used in vehicles and lithium-ion batteries used for portable electronics and other uses. Batteries come in many shapes and sizes, from miniature cells used to power hearing aids and wristwatches to battery banks the size of rooms that provide standby power for telephone exchanges and computer data centers.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
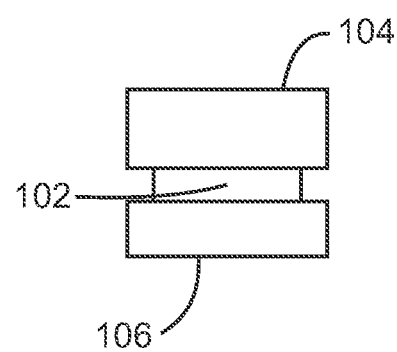
FIG. 1 is a diagram of an energy storage device having a laser weld in accordance with embodiments of the present techniques.

The present techniques are directed an energy storage device, such as a battery, having an electrode tab, an electrode, and a laser weld coupling the electrode tab to the electrode. Fabrication of the energy storage device may involve cleaning a surface of a thin layer of the electrode, placing the electrode tab adjacent the surface, and laser welding the electrode tab to the thin layer. The present techniques relate generally to energy storage devices and their manufacture and, more particularly, to batteries and their fabrication including laser welding of a thicker component onto a thinner component. An embodiment includes an energy storage device (e.g., a battery or lithium-ion battery) having electrode tabs, electrodes, and a laser weld coupling the electrode tab to the electrode. Again, a laser weld may couple an electrode tab to a thin layer of the electrode. The electrode tab may have a thickness greater than the thickness of the thin layer of the electrode. In some examples, the electrode is a silicon component and the thin layer of the electrode is a thin layer of metal (e.g., an electroplated).

The electrode may be an anode, and with the electrode tab as an anode tab including copper (Cu). The electrode may be a cathode, and with the electrode tab as a cathode tab including aluminum (Al). In fabrication of the battery, embodiments may connect the tabs to silicon anodes and silicon cathodes using laser welding such as micro-welding via a laser. Some examples may apply to battery technology metallization to connect tabs to anodes and cathodes using thin-metal laser welding. In certain examples, tabs may be attached to lithium ion (Li-ion) battery silicon anodes and cathodes using laser welding. A copper (Cu) tab(s), for instance, may be attached to an anode of the battery or cell. An aluminum (Al) tab(s), for example, may be attached a cathode of the battery or cell. In some examples, multiple anodes and multiple cathodes, and/or multiple components of an anode and multiple components of a cathode, may be employed in a battery or battery cell.

Laser welding or laser beam welding (LBM) may a welding technique used to join pieces of metal through use of a laser, and with the laser beam providing a concentrated heat source. A continuous or pulsed laser may be employed, depending on the application. Moreover, solid-state lasers and/or gas lasers may be used. Gas lasers may use a gas or mixtures of gases such as helium, nitrogen, carbon dioxide ($CO_2$ laser), and so forth. When the gas medium is excited, the medium emits photons and forms the laser beam.

A fiber laser to perform the weld may be a variation of a solid-state laser but with the medium as a clad fiber rather than a rod, a slab, or a disk. Indeed, with a fiber laser, the gain medium may be the optical fiber itself. In a particular example, the laser weld may be formed via a single-mode fiber laser which may provide for a relatively shallow weld, e.g., the weld having a height or thickness of 5 microns ($\mu m$) to 15 $\mu m$. Single-mode fibers (also called monomode fibers) may be optical fibers that support a single propagation mode per polarization direction for a given wavelength.

Embodiments of the laser-welding process may be relatively fast and substantially clean, and cost less than the flame spray process, for instance. Further, examples of the laser welding involve fewer actions or steps than the flame spray process. The cleanliness and efficiency may extend battery technology and facilitate additional innovations in certain examples. In contrast, the flame spray process may be a variation of thermal spraying in which melted (or heated) materials are sprayed onto a surface.

Advantageously, some examples of laser welding applied with the present techniques do not add material (e.g., weld material) to perform the weld. Indeed, the weld may be formed between the metal tab and the thin layer of metal on the electrode, with no additional material. The material of the metal tab and the material of the thin layer are melted to form the weld (joint) with no additional material in certain embodiments. Furthermore, in examples of the battery manufacture, the metal tab may be movable (at the time of making the weld) and the thicker partner of the weld. The thin layer of the electrode may be thinner partner in the weld, and the electrode substantially fixed in the battery structure or architecture. Therefore, as indicated, a thicker component may be welded onto a thinner component.

A particular example herein involves laser welding thicker tabs (e.g., having a thickness in the range of 15 μm to 25 μm) to thinner base electroplated metals (e.g., having a thickness in the range of 2 μm to 5 μm). This welding of a thicker component onto a thinner component may be facilitated by employing a single-mode fiber laser. In other words, the single-mode fiber laser may provide sufficient heat energy in a controlled manner to a very small area, leading to melting of a top tab (thicker component) portion and wetting the base-metal thin layer (thinner component) on the electrode to form the joint.

Moreover, as indicated, the laser welding in this instance may generate substantially less waste as compared to flame spray process. The flame spray process, in contrast to examples of laser welding herein, can involve significant metal dust, high-voltage electrical supplies, and a comprehensive exhaust system. The proposed technique herein may use fewer steps as compared to flame spray process and other battery welding processes. Embodiments herein related to laser welding may be employed in lieu of or in addition to the flame spray process. In examples, the laser welding may complement the flame spray process in the fabrication of an energy storage device or battery.

FIG. 1 is an energy storage device 100 having a laser weld 102 of a first component 104 to a second component 106. In the illustrated embodiment, the first component 104 is represented as thicker than the second component 106. In some examples, energy storage device 100 is a battery or battery cell, the first component is a tab 104, and the second component 106 is an electrode (e.g., anode or cathode). In some examples for a lithium ion (Li-ion) battery, tabs may be attached to silicon anodes and cathodes using laser welding. A copper (Cu) tab(s), for instance, as the first component 104 may be attached to an anode (as the second component 106) of the battery. An aluminum (Al) tab(s) as the first component 104, for example, may be attached a cathode (as the second component 106) of the battery. Tabs may be welded to the cathode and anode to provide electrical connections. A tab may connect each electrode to its corresponding terminal. In the manufacture of an energy storage device 100 such as battery or battery cell, a first component 104 (e.g., a tab) may be welded to second component 106 (e.g., an electrode). In certain examples, the first component 104 (e.g., a tab) is thicker than a layer of the second component 106 (e.g., an electrode). The laser weld 102 may be formed by welding the thicker first component 104 onto a thinner layer of the second component 106.

Again, in certain examples, the energy storage device 100 may be a lithium-ion battery. Indeed, these examples may implement the aforementioned laser welding in the fabrication of lithium-ion batteries. While the discussion herein may focus at times on lithium-ion batteries, embodiments of the present techniques are applicable to other types of batteries and energy storage devices. Some embodiments may be applicable to devices other than energy storage devices, such as devices having a micro-weld joining two components, devices having a micro-weld attaching a thicker component to a thinner component, and the like.

A lithium-ion battery (Li-ion battery or LIB) is generally a member of a family of rechargeable battery types in which lithium ions move from the negative electrode to the positive electrode during discharge and back when charging. The electrolyte, which allows for ionic movement, and the two electrodes may be constituent components of a lithium-ion battery cell. As for the electrochemistry, the participants in the electrochemical reactions in a lithium-ion battery are generally the negative and positive electrodes with the electrolyte providing a conductive medium for lithium ions to move between the electrodes. Both electrodes typically allow lithium ions to move in and out of their interiors. Chemistry, performance, cost, and other characteristics may vary across lithium-ion battery types.

Three functional components of a lithium-ion battery may be the positive electrode(s), negative electrode(s), and electrolyte. Generally, the negative electrode of a conventional lithium-ion cell is made from carbon or graphite but may also be silicon, for example. The positive electrode is a metal oxide but may also be silicon, and the electrolyte is a lithium salt in an organic solvent in certain examples. The electrochemical roles of the electrodes may reverse between anode and cathode, depending on the direction of current flow through the cell. The electrolyte may be typically a mixture of organic carbonates such as ethylene carbonate or diethyl carbonate containing complexes of lithium ions. These non-aqueous electrolytes generally use non-coordinating anion salts such as lithium hexafluorophosphate (LiPF6), lithium hexafluoroarsenate monohydrate (LiAsF6), lithium perchlorate (LiClO4), lithium tetrafluoroborate (LiBF4), and lithium triflate (LiCF3SO3).

Depending on materials choices, the voltage, energy density, life, and other factors of a lithium-ion battery can change, sometimes significantly. Recently, architectures using nanotechnology have been employed to improve performance. Because of the reactivity of pure lithium with water, a non-aqueous electrolyte is typically used, and a sealed container may exclude moisture from the battery pack. In some instances, lithium-ion batteries may generally operate over a wider temperature range with higher energy densities than other batteries. Lithium ion batteries may employ a protective circuit to limit peak voltage.

Embodiments provide a technique to attach metal (Cu or Al) tab on top of anode silicon component(s) or cathode silicon component(s), respectively, of a battery using a very thin electroplated metal as a base metal on the silicon components. Some examples facilitate to join dissimilar materials and, therefore, may lead to additional applications. The techniques may be advanced by cleanliness of the affected two surfaces and by the substantially intimate contact of the two surfaces. The cleanliness of a surface may be achieved using laser cleaning. The intimate contact of the two surfaces may be promoted by using a welding-process fixture such as a right fixture.

Thus, examples may fabricate silicon Li-ion batteries in which thin metals are connected using a joining technique such as laser welding. Again, certain examples may join very thin and dissimilar metals or other materials using laser energy. Moreover, the laser weld may be more shallow and smooth as compared to traditional welds in batteries. Embodiments may be directed generally to silicon Li-ion batteries, in joining dissimilar and very thin materials and forming a joint with electrical resistance and pull strength. Examples may lead to energy storage devices for next generation of capacity and performance.

Figure 2:
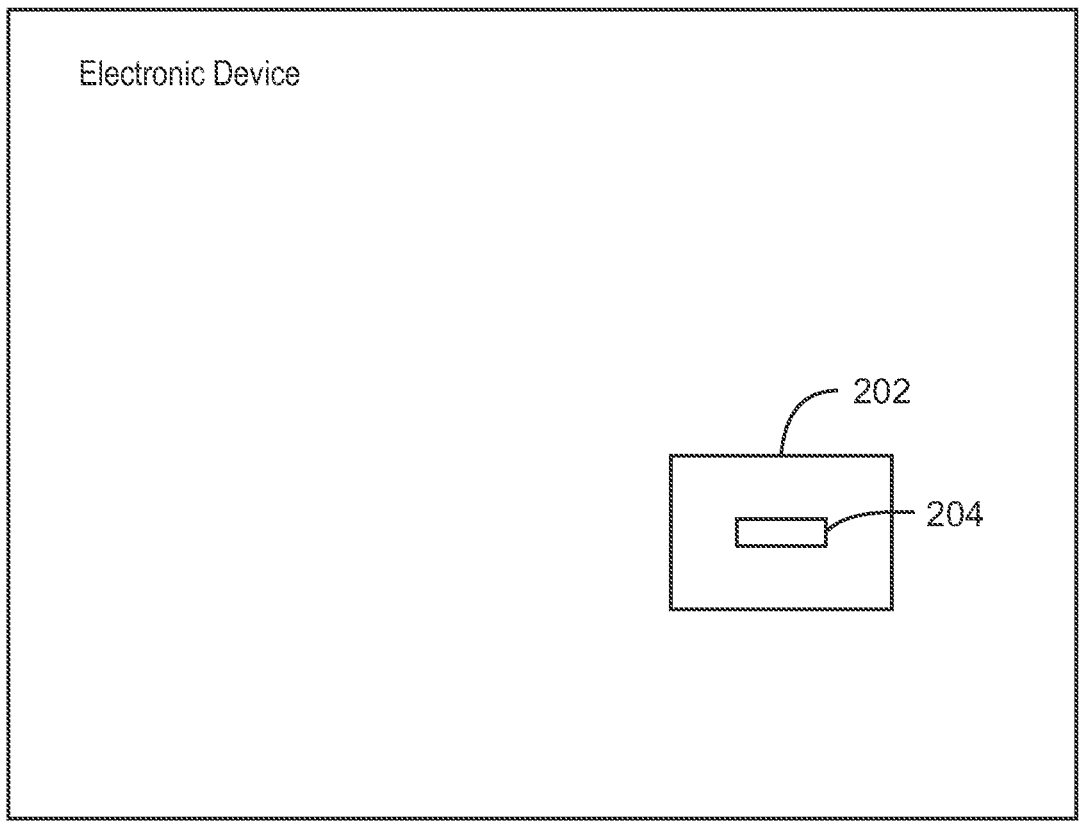
FIG. 2 is a diagram of an electronic device having an energy storage device with a laser weld in accordance with embodiments of the present techniques.

FIG. 2 is an electronic device 200 having a battery pack having one or more batteries 204 (or cells). The battery 204 or cell may have a laser weld, such as the laser weld 102 discussed above and the laser welds discussed below. The electronic device 200 may be a computer notebook, laptop, tablet, smartphone, a smart watch, computer glasses, an audio device, handheld electronics, electric tools, medical equipment, and so on. Of course, other electronic devices are applicable.

Although the word "battery" is a common term to describe an electrochemical storage system, international industry standards may differentiate between a "cell" and a "battery." A "cell" may be a plain electrochemical unit that contains the basic components such as electrodes, separator, and electrolyte. In the case of lithium-ion cells, a cell may be the single cylindrical, rectangular, prismatic, or pouch unit, and the like, that provides an average potential difference at its terminals (e.g., 3.3 volts or V, of 3.7 V, etc.). A "battery" or "battery pack" may be a collection of cells or cell assemblies which may be ready for use, as the battery or battery pack may contain a housing, electrical interconnections, and possibly electronics to control and protect the cells from failure, and the like. In this regard, the simplest "battery" may be a single cell with perhaps a small electronic circuit for protection. The distinguishing between "cell" and "battery" may not impact certain embodiments. The term "module" may be used as an intermediate topology, with the understanding that a battery pack is made of modules, and modules are composed of individual cells, for example. Other configurations, topologies, and nomenclature are applicable.

For computer notebooks or laptops, lithium-ion cells may be supplied as part of a battery pack with temperature sensors, voltage converter/regulator circuit, voltage tap, battery charge state monitor, the main connector, and so on. These components may monitor the state of charge and current in and out of each cell, capacities of each individual cell, temperature of each cell, and reduce risk and/or increase notice of short circuits. Lithium-ion batteries may be common in consumer electronics, and may be rechargeable batteries for portable electronics, with a relatively high energy density, small memory effect, and only a relatively slow loss of charge when not in use. Beyond consumer electronics, lithium-ion batteries may also be applicable in military, electric vehicles, aerospace applications, and so forth.

As discussed, for the manufacture of the battery or battery cell, a tab may be welded to an electrode. In particular, tabs in the battery may be welded to the cathode and anode to provide electrical connections. A tab may connect each electrode to its corresponding terminal.

Figure 3:
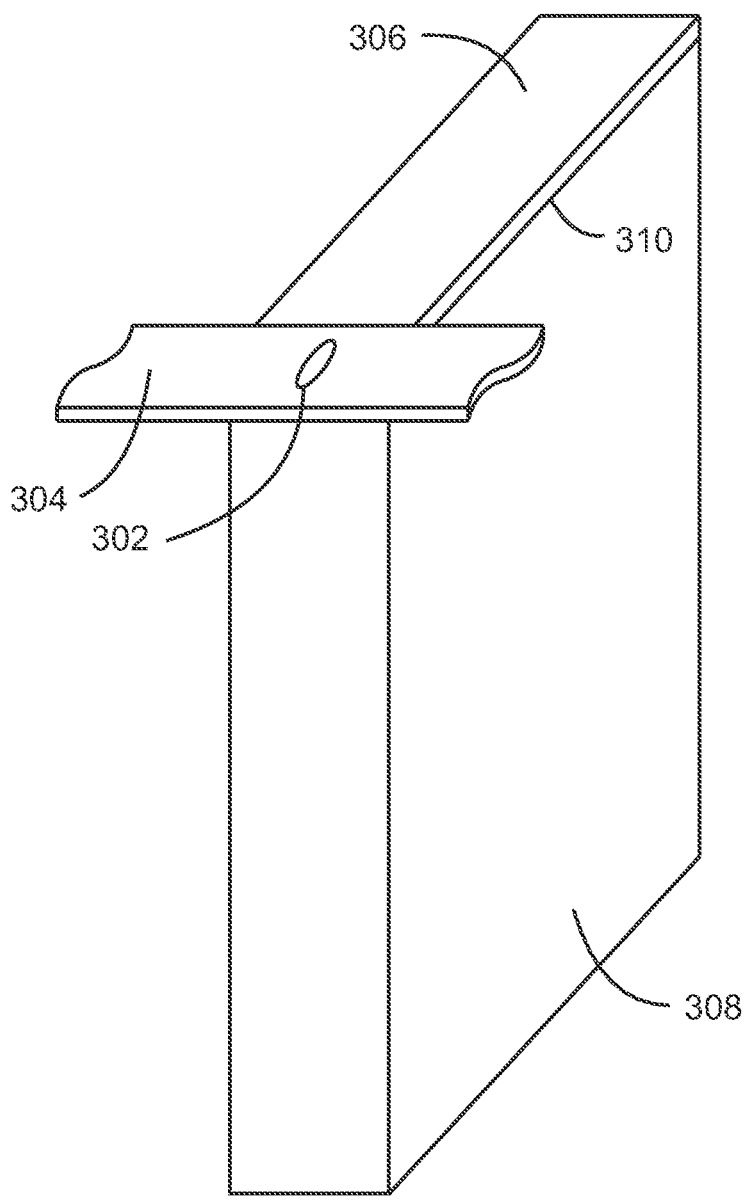
FIG. 3 is a diagram of laser-welded configuration of an energy storage device in accordance with embodiments of the present techniques.

FIG. 3 is a laser-welded configuration 300 of an energy storage device (e.g., 100 of FIG. 1) such as a lithium-ion battery or cell. In the illustrated embodiment, a laser weld 302 is formed by laser welding an electrode tab 304 to a top surface 306 of an electrode 308. In particular, the electrode tab 304 is laser welded to a top layer 310 of the electrode 308. In some examples, tabs 304 may be attached to lithium ion (Li-ion) battery silicon anodes and silicon cathodes using laser welding. For an anode electrode 310, the tab 304 may be copper (Cu). Other examples of material for the anode tab 304 may be titanium or nickel, for instance. For a cathode electrode 310, the tab 304 may be aluminum (Al). Other examples of material for a cathode tab 304 may be nickel or NiP, for instance. Indeed, other tab 304 materials are applicable.

In the illustrated embodiment, the electrode 308 is rectangular and generally flat. In a particular example, the electrode 308 may have a width in the range of 60 µm to 100 µm, a height of about 1 millimeter, a depth of about 4 centimeters. Of course, other dimensions may be accommodated. Further, other geometries of the electrode 308 such as circular, cylindrical, irregular, and so on, may be implemented.

The electrode tab 304 may be welded to the electrode 308 to provide an electrical connection within the battery. A tab 304 may connect each electrode 310 to its corresponding terminal. The bulk base of the electrode 308 may be silicon or graphite. The layer 310 may be a thin film of Cu or nickel phosphide (NiP). The laser weld 302 may be more shallow and/or more smooth than other types of welds in the battery. In sum, in the manufacture of an energy storage device such as battery or battery cell, a first component (e.g., tab 304) may be welded to a layer 310 of a second component (e.g., an electrode 308). In certain examples, the first component (e.g., a tab 304) is thicker than the layer 310 of the second component (e.g., an electrode 308). In the fabrication of the battery and making the weld 302, the tab 304 may be placed on the layer 310 of the electrode 308 that is substantially fixed in the battery or cell structure.

Various actions may be performed in making a laser weld in an energy storage device. For example, as mentioned, the surfaces of the components to be welded may be cleaned. In examples, a laser-cleaning may be deployed. Gas lasers, such as a CO2 laser, may be used to perform the laser-cleaning of the surface prior to the making the weld with a fiber laser, for example. The surface cleaned may be a surface (e.g., a top surface) of a metal thin layer of a silicon electrode. Other types of cleaning may be employed in lieu of or in addition to laser-cleaning, such as mechanical cleaning, chemical cleaning, electro-cleaning, and so forth. Further, the cleaned surface(s) may be preserved as clean at least in part via application of an inert atmosphere (e.g., using Argon) near the surface cleaned. In a particular example, a relatively thick metal foil as a tab may be placed in close proximity (e.g., intimate contact) with the anode (or cathode) component(s) (e.g., sheets or blocks) to make the weld feasible. A welding fixture may be employed to promote intimate contact of the tab (e.g., foil) with the anode (or cathode) component(s).

Several parameters may be specified and control in performing the laser welding of the foil tab to the anode (or cathode) component. Such a parameter may be laser energy. The amount of laser energy may affect the thickness of the weld. A target value for laser energy or pulse energy may be beneficial. Therefore, a single-mode fiber laser (e.g., low power) may be employed to perform the laser weld. Laser energy or pulse energy may be a function of laser power and pulse duration. In one example, a 20 watt (W) laser is employed, and the laser device is modulated between 50 percent and 80 percent to give 10 W to 16 W. Another range may be 8 W to 20 W. Other wattage lasers, modulation percentages, and wattage values applied are applicable. The laser pulse duration (or pulse width) may be in orders of magnitude of nanoseconds to microseconds, such as in the range of 10 nanoseconds to 5 microseconds. Other parameters of the laser for the welding that may be specified and/or controlled include pulse rate or frequency, spot size, and so on. The spot size (area) may in the range of 3 to 10 µm by 3 to 10 microns, and other values. In particular examples, the spot size is 3 µm×3 µm, 5 µm×5 µm, or 8 µm×8 µm, and so on.

Figure 4:
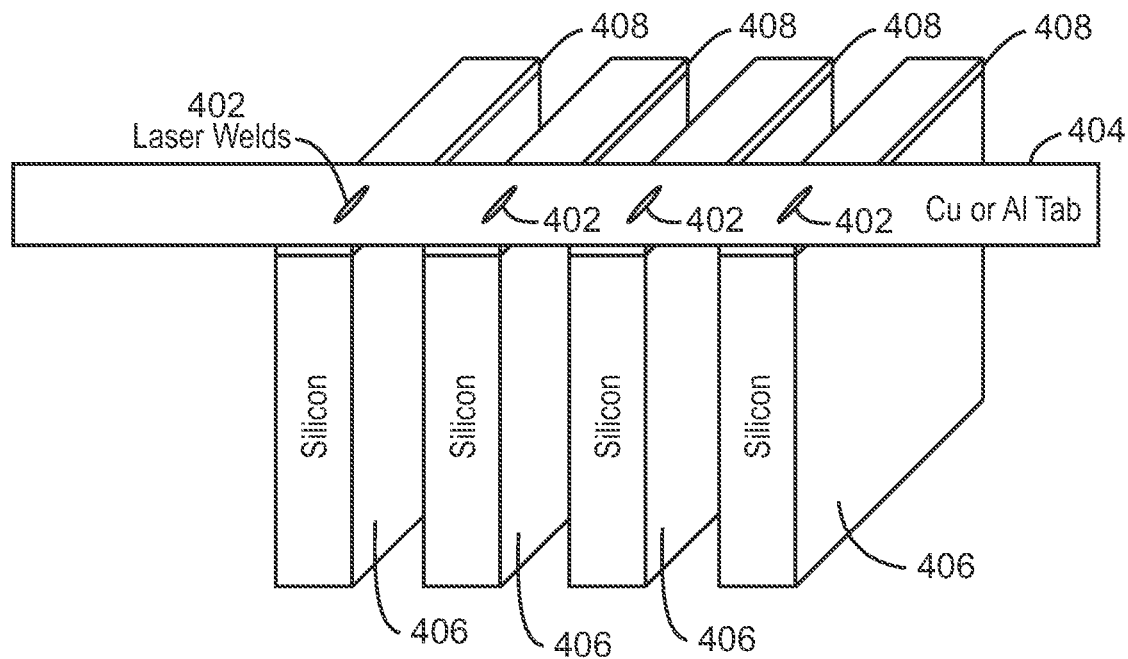
FIG. 4 is a diagram of laser-welded configuration of an energy storage device in accordance with embodiments of the present techniques.

FIG. 4 is a laser-welded configuration 400 of an energy storage device (e.g., 100 of FIG. 1) such as a lithium-ion battery or cell. In the illustrated embodiment, multiple laser welds 402 are formed by laser welding respective electrode tabs 404 to respective silicon components 406. In particular, the respective electrode tabs 404 may be welded to a top layer 408 of the silicon components 406. The silicon components 406 may be electrodes (or components of an electrode) in a battery or cell such as a lithium-ion battery or cell. In some examples, each silicon component 406 is an electrode. For anode silicon components 406, the tab 404 may be copper (Cu). For cathode silicon components 406, the tab 404 may be aluminum (Al). An electrode tab 404 may be welded to silicon components 406 to provide electrical connections within the battery. A tab 404 may connect the electrode associated with the silicon component 406 to a corresponding terminal.

The bulk base of the electrode or silicon component 406 is silicon in the illustrated example. The layer 408 may be, for example, a thin film of Cu or NiP. In embodiments, the layer 408 is an electroplated metal. In certain examples, the tab 404 may have a thickness in the range of 10 p$\mu$m to 40 $\mu$m, or in the range of 15 $\mu$m to 25 $\mu$m, and so forth. In those examples, the layer 408 may have a thickness in the range of 1 $\mu$m to 8 $\mu$m, or in the range of 2 $\mu$m to 5 $\mu$m, and the like. Thus, as indicated, a thicker component may be welded to a thinner component. In the fabrication of the battery and making the welds 402, the tab 404 may be placed on the layer 406 of the silicon components 408 that are substantially fixed in the battery architecture. Lastly, the laser welds 402 may be shallower and/or smoother than other types of battery welds. In certain embodiments, the average thickness of a given laser weld 402 may 5 $\mu$m, 7 $\mu$m, 10 $\mu$m, 12 $\mu$m, 15 $\mu$m, etc.

Figure 5:
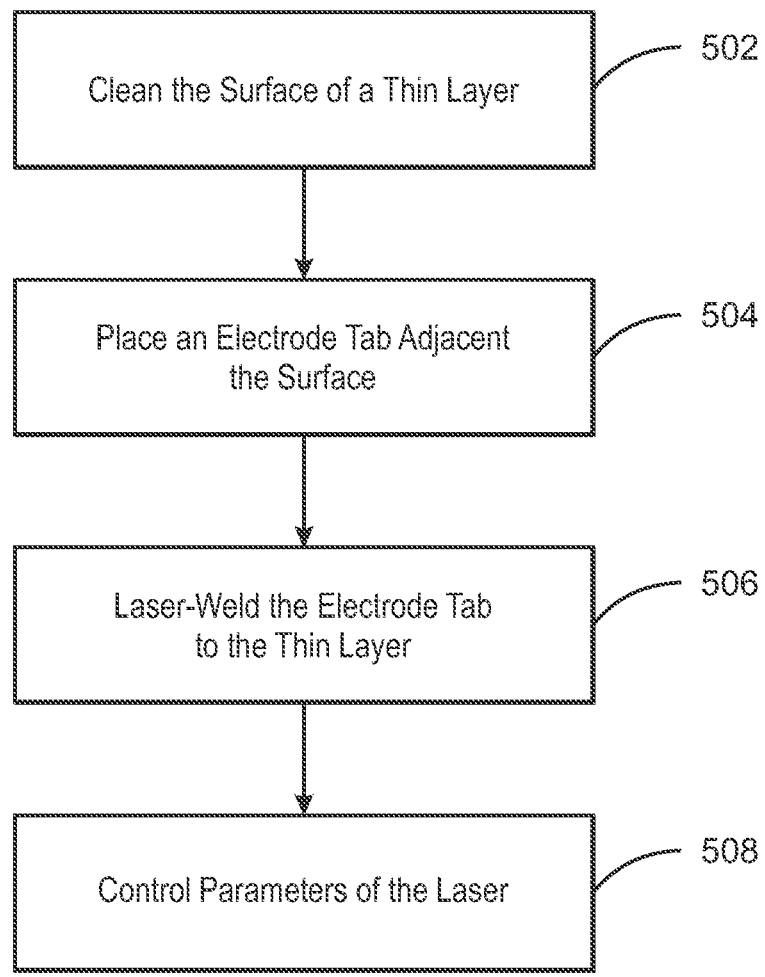
FIG. 5 is a block flow diagram of a method of fabricating an energy storage device in accordance with embodiments of the present techniques.

FIG. 5 is a method 500 of fabricating an energy storage device such as a lithium-ion battery. At block 502, the method includes cleaning a surface of a thin layer of an electrode (e.g., cathode, anode) of the energy storage device (e.g., battery or battery cell). For example, the cleaning may be laser-cleaning of the surface under an inert (e.g., Argon) atmosphere. Other forms of cleaning may include mechanical cleaning, chemical cleaning, electro-cleaning, and so forth. As for laser cleaning, a particular example may be via a gas laser such as a carbon dioxide ($CO_2$) laser. At block 504, the method includes placing an electrode tab adjacent the surface. A fixture (e.g., a right fixture) may be employed to promote substantial intimate contact of the electrode tab with the surface. Other devices and techniques may be implement to advance intimate contact of the electrode tab with the electrode. At block 506, the method includes laser welding such as via a fiber laser (e.g., via a single-mode fiber laser) the electrode tab to the thin layer and electrode. The electrode may be a silicon component, and the thin layer may be an electroplated material. The electrode tab may have a thickness in the range of 10 $\mu$m to 40 $\mu$m, and the thin layer may have a thickness in a range of 1 $\mu$m to 8 $\mu$m. Therefore, examples may implement welding of a thicker component to a thinner component.

At block 508, parameters of the laser (e.g., single-mode fiber laser) may be controlled in performing the laser weld. For example, the wavelength and amount of energy may be specified and controlled. The power of the laser may be controlled in a range of 8 W to 20 W, or 10 W to 18 W, and other ranges. Further, pulse width or pulse duration of the laser may be controlled in a range of 10 nanoseconds to 5 microseconds, and the like. Other pulse duration and width ranges are applicable. Furthermore, the spot-size area of the laser for the weld on the component may be controlled in a range of (3 $\mu$m to 10 $\mu$m)×(3 $\mu$m to 10 $\mu$m). Parameters controlled may include laser energy, pulse energy, pulse rate, and other parameters.

Figure 6:
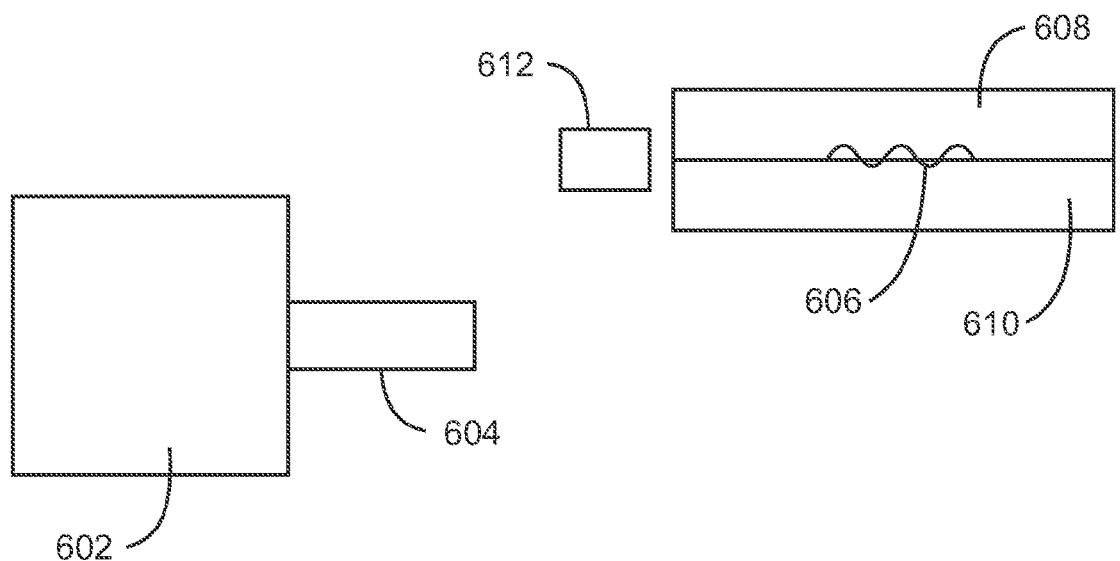
FIG. 6 is a block diagram of a laser welding system for an energy storage device in accordance with embodiments of the present techniques.

FIG. 6 is a laser welding system 600 for an energy storage device. The system 600 a laser welding device 602 having a laser element 604. Two types of lasers employed may be solid-state lasers (e.g., ruby laser, Nd:YAG lasers etc.) and gas lasers. Solid state lasers may use different solid media, including synthetic ruby (e.g., chromium in aluminum oxide), neodymium in glass (Nd:glass), neodymium in yttrium garnet (Nd:YAG), etc. In certain examples, the laser welding device 602 is a single-mode fiber laser device. The laser welding device 602 via the laser element 604 may be employed to form a laser weld 606 between a first component 608 and a second component 610. The first component 608 (e.g., electrode tab) and the second component 610 (e.g., silicon electrode or metal layer of a silicon electrode) may be components of an energy storage device such as a lithium ion battery. The laser welding device 602 may be used to laser weld the first component 608 to the second component 610, forming the laser weld 606 coupling the first component 608 to the second component 610. The laser weld 606 may be formed on a thin layer (not shown) of the second component 610. In some examples, the first component 608 has a greater thickness than the second component 610.

As indicated above for one example, a laser welding device 602 may be, for instance, a 20 watt (W) laser device, and the laser device modulated 50 percent to 80 percent to give 10 W to 16 W, for example. Another exemplary range of applied power may be 8 W to 20 W. A variety of wattage lasers, modulation percentages, and wattage values applied are applicable. The laser pulse duration (or pulse width) applied by the laser welding device 602 and its laser 604 element may be in orders of magnitude of nanoseconds to microseconds, such as in the range of 10 nanoseconds to 5 microseconds. Other parameters of the laser implemented by the laser welding device 602 that may be specified and/or controlled include pulse rate, spot size, and so on. The spot size may in the range of 3 to 10 $\mu$m by 3 to 10 $\mu$m, and other values. In particular examples, the spot size is 3 $\mu$m×3 $\mu$m, 5 $\mu$m×5 $\mu$m, or 8 $\mu$m×8 $\mu$m, and so on.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is an energy storage device. The device includes an electrode tab; an electrode; and a laser weld coupling the electrode tab to the electrode.

Example 2 includes the device of example 1, including or excluding optional features. In this example, the energy storage device comprises a battery, and wherein the electrode comprises a silicon component.

Example 3 includes the device of any one of examples 1 to 2, including or excluding optional features. In this example, the energy storage device comprises a lithium-ion battery.

Example 4 includes the device of any one of examples 1 to 3, including or excluding optional features. In this example, the electrode comprises a thin layer, wherein the laser weld couples the electrode tab to the thin layer, and wherein the electrode tab has a thickness greater than a thickness of the thin layer.

Example 5 includes the device of any one of examples 1 to 4, including or excluding optional features. In this example, the electrode comprises a silicon component having a thin layer, and wherein the laser weld couples the electrode tab to the thin layer.

Example 6 includes the device of any one of examples 1 to 5, including or excluding optional features. In this example, the laser weld is formed via a single-mode fiber laser.

Example 7 includes the device of any one of examples 1 to 6, including or excluding optional features. In this example, the laser weld comprises an average height in a range of 5 microns to 15 microns.

Example 8 includes the device of any one of examples 1 to 7, including or excluding optional features. In this example, the electrode comprises an anode, and wherein the electrode tab comprises an anode tab comprising copper (Cu).

Example 9 includes the device of any one of examples 1 to 8, including or excluding optional features. In this example, the electrode comprises a cathode, and wherein the electrode tab comprises a cathode tab comprising aluminum (Al).

Example 10 is an electronic device. The electronic device includes a battery comprising: an electrode tab; an electrode; and a laser weld coupling the electrode tab to the electrode.

Example 11 includes the electronic device of example 10, including or excluding optional features. In this example, the battery comprises a lithium-ion battery, and wherein the electrode tab electrically connects the electrode to a terminal of the battery.

Example 12 includes the electronic device of any one of examples 10 to 11, including or excluding optional features. In this example, the electrode comprises a silicon component having a thin layer, and wherein the laser weld couples the electrode tab to the thin layer, and wherein the electrode tab has a thickness greater than a thickness of the thin layer. Optionally, the electrode tab comprises a thickness in a range of 10 µm to 40 µm, and the thin layer comprises a thickness in a range of 1 µm to 8 µm.

Example 13 includes the electronic device of any one of examples 10 to 12, including or excluding optional features. In this example, the laser weld is formed via a single-mode fiber laser, and wherein the laser weld comprises an average thickness in a range of 5 microns to 15 microns.

Example 14 includes the electronic device of any one of examples 10 to 13, including or excluding optional features. In this example, the electrode comprises an anode, and wherein the electrode tab comprises an anode tab comprising copper (Cu).

Example 15 includes the electronic device of any one of examples 10 to 14, including or excluding optional features. In this example, the electrode comprises a cathode, and wherein the electrode tab comprises a cathode tab comprising aluminum (Al).

Example 16 is a method of fabricating an energy storage device. The method includes cleaning a surface of a thin layer of an electrode of the energy storage device; placing an electrode tab adjacent the surface; and laser welding the electrode tab to the thin layer.

Example 17 includes the method of example 16, including or excluding optional features. In this example, the energy storage device comprises a lithium-ion battery, and wherein the thin layer comprises a metal thin layer.

Example 18 includes the method of any one of examples 16 to 17, including or excluding optional features. In this example, cleaning comprises laser-cleaning the surface under an inert atmosphere. Optionally, the laser-cleaning is performed by a gas laser.

Example 19 includes the method of any one of examples 16 to 18, including or excluding optional features. In this example, placing the electrode tab comprises employing a fixture to promote contact of the electrode tab substantially intimately with the surface, wherein the electrode comprises a silicon component, wherein the thin layer comprises an electroplated material, wherein the electrode tab comprises a thickness in a range of 10 µm to 40 µm, and wherein the thin layer comprises a thickness in a range of 1 µm to 8 µm.

Example 20 includes the method of any one of examples 16 to 19, including or excluding optional features. In this example, laser welding comprises laser welding, via a single-mode fiber laser, the electrode tab to the thin layer. Optionally, the method includes controlling laser power of the single-mode fiber laser in a range of 8 Watts to 20 Watts; and controlling an area to less than 10 µm by 10 µm for spot size of the single-mode fiber laser for the weld.

Example 21 includes the method of any one of examples 16 to 20, including or excluding optional features. In this example, the electrode comprises multiple electrodes each comprising a silicon component having the thin layer as a metal layer.

Example 22 includes the method of any one of examples 16 to 21, including or excluding optional features. In this example, the electrode comprises multiple silicon components.

Example 23 is an energy storage device. The device includes an electrode tab; an electrode having a thin layer; and a laser weld coupling the electrode tab to the thin layer.

Example 24 includes the device of example 23, including or excluding optional features. In this example, the energy storage device comprises a lithium-ion battery, wherein the electrode comprises a silicon component having the thin layer, and wherein the electrode tab has a thickness greater than a thickness of the thin layer.

Example 25 includes the device of any one of examples 23 to 24, including or excluding optional features. In this example, the laser weld is formed via a single-mode fiber laser, and wherein the laser weld comprises an average height in a range of 5 microns to 15 microns.

Example 26 includes the device of any one of examples 23 to 25, including or excluding optional features. In this example, the electrode comprises an anode, and wherein the electrode tab comprises an anode tab comprising copper (Cu).

Example 27 includes the device of any one of examples 23 to 26, including or excluding optional features. In this example, the electrode comprises a cathode, and wherein the electrode tab comprises a cathode tab comprising aluminum (Al).

Example 28 is an electronic device. The electronic device includes a battery comprising: an electrode tab; an electrode; and a laser weld coupling the electrode tab to the electrode, wherein the laser weld couples the electrode tab to a thin layer of the electrode, and wherein the electrode tab has a thickness greater than a thickness of the thin layer.

Example 29 includes the electronic device of example 28, including or excluding optional features. In this example, the battery comprises a lithium-ion battery, wherein the thin layer comprises metal, wherein the electrode comprises a silicon component having the thin layer, and wherein the electrode tab electrically connects the electrode to a terminal of the battery.

Example 30 includes the electronic device of any one of examples 28 to 29, including or excluding optional features. In this example, the electrode comprises an anode or cathode, and wherein the electrode tab comprises an anode tab comprising copper (Cu) or a cathode tab comprising aluminum (Al), wherein the electrode tab comprises a thickness in a range of 10 µm to 40 µm, and the thin layer comprises a thickness in a range of 1 µm to 8 µm.

Example 31 includes the electronic device of any one of examples 28 to 30, including or excluding optional features. In this example, the laser weld is formed via a single-mode fiber laser, and wherein the laser weld comprises an average thickness in a range of 5 microns to 15 microns.

Example 32 is a method of fabricating an energy storage device. The method includes cleaning a surface of a thin layer of an electrode of the energy storage device; placing an electrode tab adjacent the surface; and laser welding the electrode tab to the thin layer.

Example 33 includes the method of example 32, including or excluding optional features. In this example, the energy storage device comprises a lithium-ion battery, and wherein the thin layer comprises a metal thin layer.

Example 34 includes the method of any one of examples 32 to 33, including or excluding optional features. In this example, cleaning comprises laser-cleaning the surface under an inert atmosphere, and wherein the laser-cleaning is performed by a gas laser.

Example 35 includes the method of any one of examples 32 to 34, including or excluding optional features. In this example, placing the electrode tab comprises employing a fixture to promote contact of the electrode tab substantially intimately with the surface, wherein the electrode comprises a silicon component, wherein the thin layer comprises an electroplated material, wherein the electrode tab comprises a thickness in a range of 10 µm to 40 µm, and wherein the thin layer comprises a thickness in a range of 1 µm to 8 µm.

Example 36 includes the method of any one of examples 32 to 35, including or excluding optional features. In this example, laser welding comprises laser welding, via a single-mode fiber laser, the electrode tab to the thin layer. Optionally, the method includes controlling laser power of the single-mode fiber laser in a range of 8 Watts to 20 Watts; and controlling an area to less than 10 µm by 10 µm for spot size of the single-mode fiber laser for the weld.

Example 37 is a fabrication system for an energy storage device. The system includes means for cleaning a surface of a thin layer of an electrode of the energy storage device; means for placing an electrode tab adjacent the surface; and means for laser welding the electrode tab to the thin layer.

Example 38 includes the system of example 37, including or excluding optional features. In this example, the energy storage device comprises a battery, and wherein the thin layer comprises a metal thin layer.

Example 39 includes the system of any one of examples 37 to 38, including or excluding optional features. In this example, the energy storage device comprises a lithium-ion battery.

Example 40 includes the system of any one of examples 37 to 39, including or excluding optional features. In this example, means for cleaning comprises means for laser-cleaning the surface under an inert atmosphere.

Example 41 includes the system of any one of examples 37 to 40, including or excluding optional features. In this example, means for placing the electrode tab promotes contact of the electrode tab substantially intimately with the surface.

Example 42 includes the system of any one of examples 37 to 41, including or excluding optional features. In this example, the electrode comprises a silicon component, and wherein the thin layer comprises an electroplated material.

Example 43 includes the system of any one of examples 37 to 42, including or excluding optional features. In this example, the electrode tab comprises a thickness in a range of 10 µm to 40 µm, and wherein the thin layer comprises a thickness in a range of 1 µm to 8 µm.

Example 44 includes the system of any one of examples 37 to 43, including or excluding optional features. In this example, the system includes means for controlling an area of less than 10 µm by 10 µm for spot size of the means for laser welding.

Example 45 includes the system of any one of examples 37 to 44, including or excluding optional features. In this example, the electrode comprises an anode, and wherein the electrode tab comprises an anode tab comprising copper (Cu).

Example 46 includes the system of any one of examples 37 to 45, including or excluding optional features. In this example, the electrode comprises a cathode, and wherein the electrode tab comprises a cathode tab comprising aluminum (Al).

Example 47 includes the system of any one of examples 37 to 46, including or excluding optional features. In this example, the electrode comprises multiple electrodes each comprising a silicon component having the thin layer as a metal layer.

Example 48 includes the system of any one of examples 37 to 47, including or excluding optional features. In this example, the electrode comprises multiple silicon components.

Example 49 is a method of manufacturing an energy storage device. The method includes placing an electrode tab adjacent a thin layer of an electrode; and laser welding the electrode tab to the thin layer to couple the electrode tab to the electrode, wherein the laser welding is performed via a fiber laser.

Example 50 includes the method of example 49, including or excluding optional features. In this example, the energy storage device comprises a lithium-ion battery.

Example 51 includes the method of any one of examples 49 to 50, including or excluding optional features. In this example, the method includes cleaning a surface of the thin layer, wherein the energy storage device comprises a battery, and wherein the thin layer comprises a metal thin layer.

Example 52 includes the method of any one of examples 49 to 51, including or excluding optional features. In this example, cleaning comprises laser-cleaning the surface under an inert atmosphere, wherein the laser-cleaning is performed by a gas laser, and wherein the thin layer comprises an electroplated material.

Example 53 includes the method of any one of examples 49 to 52, including or excluding optional features. In this example, the electrode comprises a silicon component, wherein placing the electrode tab comprises employing a fixture to promote contact of the electrode tab substantially intimately with the surface, Example 54 includes the method of any one of examples 49 to 53, including or excluding optional features. In this example, the electrode tab comprises a thickness in a range of 10 μm to 40 μm, and wherein the thin layer comprises a thickness in a range of 1 μm to 8 μm.

Example 55 includes the method of any one of examples 49 to 54, including or excluding optional features. In this example, the fiber laser comprises a single-mode fiber laser.

Example 56 includes the method of any one of examples 49 to 55, including or excluding optional features. In this example, the method includes controlling laser power of the fiber laser in a range of 8 Watts to 20 Watts; and controlling an area to less than 10 μm by 10 μm for spot size of the fiber laser for the weld.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An energy storage device comprising:
   an electrode tab;
   a silicon electrode comprising a metal layer that is thinner than the electrode tab; and
   a laser weld coupling the electrode tab to the silicon electrode, wherein a joint of the laser weld comprises a melted material of the electrode tab and in electrical contact with a melted material of the metal layer.

2. The energy storage device of claim 1, wherein the energy storage device comprises a battery.

3. The energy storage device of claim 1, wherein the energy storage device comprises a lithium-ion battery.

4. The energy storage device of claim 1, wherein the silicon electrode comprises a metal layer, wherein the laser weld couples the electrode tab to the metal layer, and wherein the electrode tab has a thickness greater than a thickness of the metal layer.

5. The energy storage device of claim 1, wherein the silicon electrode comprises a silicon component having a metal layer, and wherein the laser weld couples the electrode tab to the metal layer.

6. The energy storage device of claim 1, wherein the laser weld is formed via a single-mode fiber laser.

7. The energy storage device of claim 1, wherein the laser weld comprises an average height in a range of 5 microns to 15 microns.

8. The energy storage device of claim 1, wherein the silicon electrode comprises an anode, and wherein the electrode tab comprises an anode tab comprising copper (Cu).

9. The energy storage device of claim 1, wherein the silicon electrode comprises a cathode, and wherein the electrode tab comprises a cathode tab comprising aluminum (Al).

10. An electronic device comprising:
    a battery comprising:
      an electrode tab;
      a silicon electrode comprising a metal layer that is thinner than the electrode tab; and
      a laser weld coupling the electrode tab to the silicon electrode, wherein the laser weld is formed by melting a material of the electrode tab and melting a material of the metal layer to form a joint.

11. The electronic device of claim 10, wherein the battery comprises a lithium-ion battery, and wherein the electrode tab electrically connects the silicon electrode to a terminal of the battery.

12. The electronic device of claim 10, wherein the silicon electrode comprises a silicon component having a metal layer, and wherein the laser weld couples the electrode tab to the metal layer, and wherein the electrode tab has a thickness greater than a thickness of the metal layer.

13. The electronic device of claim 12, wherein the electrode tab comprises a thickness in a range of 10 μm to 40 μm, and the metal layer comprises a thickness in a range of 1 μm to 8 μm.

14. The electronic device of claim 10, wherein the laser weld is formed via a single-mode fiber laser, and wherein the laser weld comprises an average thickness in a range of 5 microns to 15 microns.

15. The electronic device of claim 10, wherein the silicon electrode comprises an anode, and wherein the electrode tab comprises an anode tab comprising copper (Cu).

16. The electronic device of claim 10, wherein the silicon electrode comprises a cathode, and wherein the electrode tab comprises a cathode tab comprising aluminum (Al).

* * * * *